US012696373B2

(12) United States Patent
Leavitt et al.

(10) Patent No.: US 12,696,373 B2
(45) Date of Patent: Jul. 28, 2026

(54) VACUUM SEALED RF RESONATOR CAVITY FOR LINAC

(71) Applicant: Applied Materials, Inc., Santa Clara, CA (US)

(72) Inventors: William H. Leavitt, Haverhill, MA (US); William Herron Park, Jr., Marblehead, MA (US); Jason M. Schaller, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 347 days.

(21) Appl. No.: 18/384,055

(22) Filed: Oct. 26, 2023

(65) Prior Publication Data

US 2025/0142708 A1 May 1, 2025

(51) Int. Cl.
*H05H 7/02* (2006.01)
*H05H 9/00* (2006.01)

(52) U.S. Cl.
CPC ................ *H05H 7/02* (2013.01); *H05H 9/00* (2013.01); *H05H 2007/025* (2013.01); *H05H 2277/12* (2013.01)

(58) Field of Classification Search
CPC .... H05H 7/00; H05H 7/02; H05H 9/00; H01J 37/3171
See application file for complete search history.

(56) References Cited

U.S. PATENT DOCUMENTS

| | | | | |
|---|---|---|---|---|
| 10,943,767 | B1 * | 3/2021 | Kowal | H03L 7/0814 |
| 11,476,087 | B2 * | 10/2022 | Sinclair | H01J 37/3171 |
| 2005/0045835 | A1 * | 3/2005 | DiVergilio | H01J 37/12 250/492.21 |
| 2019/0088443 | A1 * | 3/2019 | Satoh | C23C 14/48 |

FOREIGN PATENT DOCUMENTS

| | | | | |
|---|---|---|---|---|
| EP | 4123182 | B1 * | 11/2025 | F04D 29/5853 |
| GB | 2566118 | A * | 3/2019 | H05H 9/041 |

* cited by examiner

*Primary Examiner* — David E Smith
(74) *Attorney, Agent, or Firm* — Nields, Lemack & Frame, LLC

(57) ABSTRACT

An RF resonator cavity that includes a resonator coil is disclosed. Unlike traditional RF resonator cavities, no sulfur hexafluoride is used in this cavity. Rather, the volume of the RF resonator cavity is pumped to vacuum conditions. This may be done using a vacuum system, or by hermetically sealing the cavity. This approach eliminates the use of a potent greenhouse gas, while maintaining the integrity of the cavity. Specifically, the dielectric strength of the vacuum is greater than that of sulfur hexafluoride. This RF resonator cavity may be deployed in a linear accelerator used to implant ions into a workpiece.

11 Claims, 3 Drawing Sheets

VACUUM SEALED RF RESONATOR CAVITY FOR LINAC

FIELD

Embodiments of the present disclosure relate to a radio frequency (RF) resonator cavity for use within a linear accelerator, where the interior volume of the RF resonator cavity is maintained at vacuum conditions.

BACKGROUND

One apparatus that is used to implant ions into workpieces is known as a linear accelerator or LINAC. The LINAC operates by accelerating bunches of ions by passing them through a series of electrodes. These electrodes are biased using oscillating voltages such that the ions are accelerated toward the electrodes as they are approaching, and then repelled as they pass the electrode.

Each electrode is electrically connected to a respective resonator coil. This resonator coil is disposed within an RF resonator cavity, along with a excitation coil. The RF resonator cavity is typically a sealed container made of a metal. Energy is supplied to the excitation coil, which causes an induced voltage in the resonator coil. This RF resonator cavity is typically grounded, while the coils may be driven with sinusoidal waveforms.

To electrically isolate the container from these sinusoidal waveforms, the RF resonator cavity is typically sealed with a gas having a high dielectric strength disposed therein. In many applications, this gas is sulfur hexafluoride ($SF_6$). Sulfur hexafluoride has a dielectric strength that is three times that of air. Furthermore, it is a non-toxic, inert insulating and quenching gas, making it an excellent insulating choice for this application.

However, the same properties that make sulfur hexafluoride an excellent insulator gas also make it a potent greenhouse gas. Sulfur hexafluoride has a Global Warming Potential (GWP) of 23,000, compared to carbon dioxide, which as a GWP of 1. In fact, sulfur hexafluoride is specifically called out in the Kyoto Protocol.

Therefore, it would be beneficial if there was a linear accelerator that utilizes the RF resonator cavities described above, but did not use sulfur hexafluoride. Further, it would be advantageous if the dielectric strength of the replacement was at least as high as that of sulfur hexafluoride.

SUMMARY

An RF resonator cavity that includes a resonator coil is disclosed. Unlike traditional RF resonator cavities, no sulfur hexafluoride is used in this cavity. Rather, the volume of the RF resonator cavity is pumped to high vacuum conditions. This may be done using a vacuum system, or by hermetically sealing the cavity. This approach eliminates the use of a potent greenhouse gas, while maintaining the integrity of the cavity. Specifically, the dielectric strength of the high vacuum is greater than that of sulfur hexafluoride. This RF resonator cavity may be deployed in a linear accelerator used to implant ions into a workpiece.

According to one embodiment, an ion implanter is disclosed. The ion implanter comprises an ion source; and a linear accelerator, wherein the linear accelerator comprises one or more RF resonator cavities, wherein each RF resonator cavity is defined by a container, a resonator coil and an excitation coil are disposed in each respective RF resonator cavity, and wherein the container is hermetically sealed and a pressure within the container is less than 1 mTorr. In some embodiments, the pressure within the container is less than 1E-5 Torr. In some embodiments, sulfur hexafluoride is not disposed in the container. In some embodiments, a distal end of the resonator coil is affixed to an accelerator electrode. In certain embodiments, the accelerator electrode passes through an opening in the container, such that a first portion of the accelerator electrode is disposed inside the RF resonator cavity and a second portion is disposed outside the RF resonator cavity, and wherein a vacuum tight insulator is used to seal the opening. In some embodiments, the excitation coil is in communication with a RF generator and a portion of the excitation coil passes through an opening in the container, and wherein a vacuum tight insulator is used to seal the opening.

According to another embodiment, an ion implanter is disclosed. The ion implanter comprises an ion source; and a linear accelerator, wherein the linear accelerator comprises one or more RF resonator cavities, wherein each RF resonator cavity is defined by a container, a resonator coil and an excitation coil are disposed in each respective RF resonator cavity, and further comprising a vacuum system in communication with each RF resonator cavity to pump air from the RF resonator cavity to an atmospheric environment, such that a pressure within the container is less than 1 mTorr. In some embodiments, the pressure within the container is pumped to less than 1E-5 Torr. In some embodiments, sulfur hexafluoride is not disposed in the container. In some embodiments, the vacuum system comprises a turbo pump in communication with the RF resonator cavity, and a backing pump in communication with an output of the turbo pump. In some embodiments, a distal end of the resonator coil is affixed to an accelerator electrode. In certain embodiments, the accelerator electrode passes through an opening in the container, such that a first portion of the accelerator electrode is disposed inside the RF resonator cavity and a second portion is disposed outside the RF resonator cavity, and wherein a vacuum tight insulator is used to seal the opening. In some embodiments, the excitation coil is in communication with a RF generator and a portion of the excitation coil passes through an opening in the container, and wherein a vacuum tight insulator is used to seal the opening.

BRIEF DESCRIPTION OF THE FIGURES

For a better understanding of the present disclosure, reference is made to the accompanying drawings, which are incorporated herein by reference and in which.

DETAILED DESCRIPTION

Figure 1:
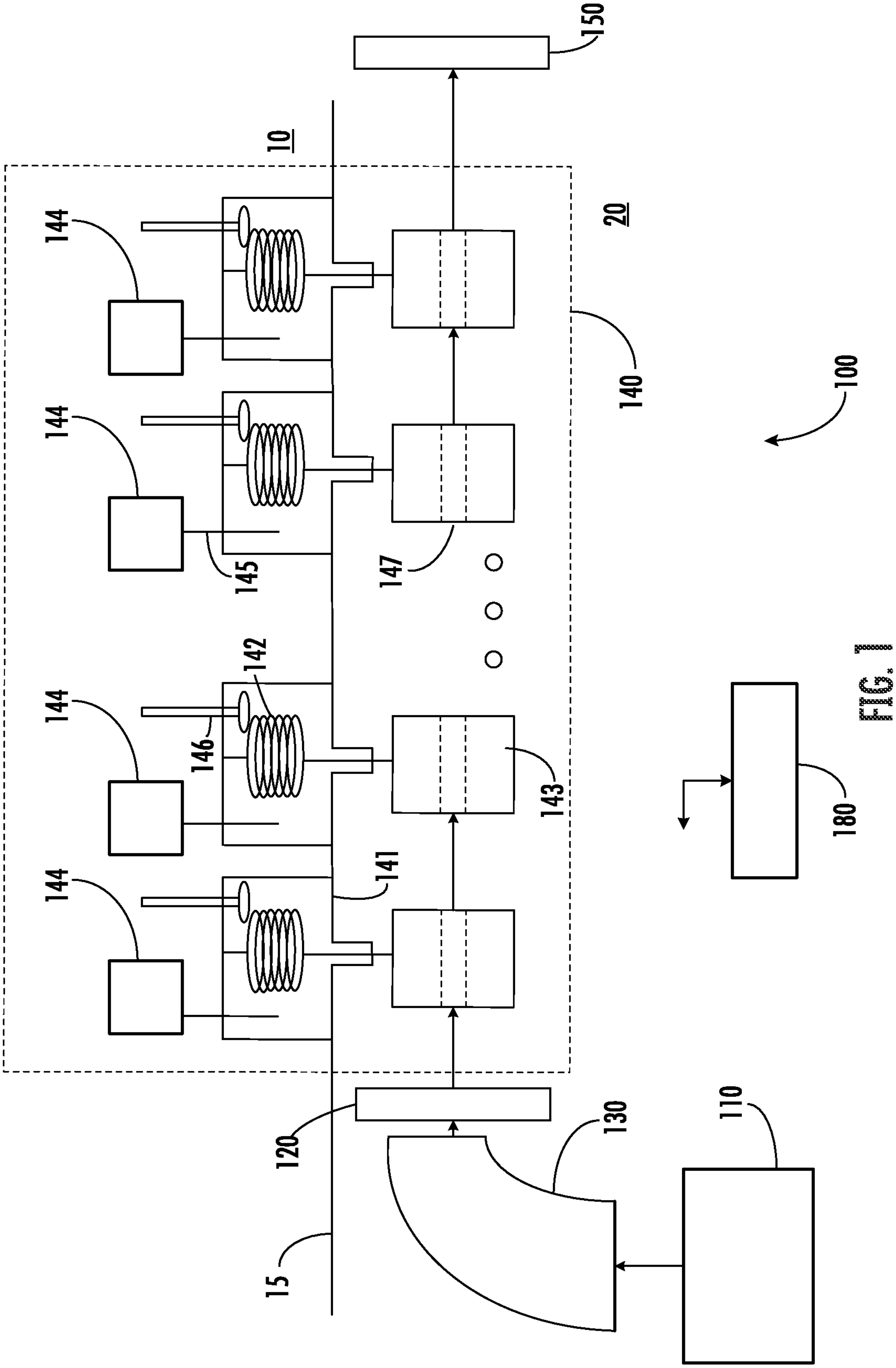
FIG. 1 shows an ion implanter that may utilize the RF resonator cavity described herein.

The improved RF resonator cavity described herein may be used as part of an ion implanter. FIG. 1 shows one such ion implanter 100. An ion source 110, a mass analyzer 130, a buncher 120 and portions of a linear accelerator 140 are disposed within the vacuum chamber 20, defined by a chamber wall 15. The ion source 110 may be any suitable ion source, such as, but not limited to, an a indirectly heated cathode (IHC) source, a Bernas source, capacitively coupled plasma source, an inductively coupled plasma source, or any other suitable device. The ion source 110 has an aperture through which ions may be extracted from the ion source 110. These ions may be extracted from the ion source 110 by applying a negative voltage to one or more electrodes, disposed outside the ion source 110, proximate the extraction aperture.

The ions may then enter a mass analyzer 130, which may be a magnet that allows ions having a particular mass to charge ratio to pass through. This mass analyzer 130 is used to separate the desired ions such that it is only the desired ions that then enter the linear accelerator 140.

The desired ions then enter a buncher 120, which creates groups or bunches of ions that travel together. The buncher 120 may comprise a plurality of drift tubes, wherein at least one of the drift tubes may be supplied with an AC voltage. One or more of the other drift tubes may be grounded. The drift tubes that are supplied with the AC voltage may serve to accelerate and manipulate the ion beam into discrete bunches.

The linear accelerator 140 comprises one or more RF resonator cavities 141. In certain embodiments, there may be between one and sixteen RF resonator cavities 141 in the linear accelerator 140. As shown in FIG. 1, a portion of the RF resonator cavity 141 may be disposed within the vacuum chamber 20, while other portions of the RF resonator cavity 141 are disposed in the atmospheric environment 10.

Each RF resonator cavity 141 may be a sealed container. Within each container is a resonator coil 142 that may be energized by electromagnetic fields created by an excitation coil 145. The resonator coil 142 may be formed of a conductive material, such as copper. The excitation coil 145 is also disposed in the RF resonator cavity 141 with a respective resonator coil 142. The excitation coil 145 is energized by an excitation voltage, which may be a RF signal. The excitation voltage may be supplied by a respective RF generator 144. Each excitation coil 145 is tuned to a single resonant frequency. In other words, the excitation voltage applied to each excitation coil 145 may be independent of the excitation voltage supplied to any other excitation coil 145. Each excitation voltage is preferably modulated at the resonance frequency of its respective excitation coil 145. The magnitude and phase of the excitation voltage may be determined and changed by a controller 180, which is in communication with the RF generator 144. By adjusting the driving RF power to the resonator coil 142 in an RF resonator cavity 141, the magnitude of the excitation voltage may be increased and/or the phase shifted Within each RF resonator cavity 141, there may be a respective tuner paddle 146. The tuner paddle 146 may be rotatable and/or movable so as to modify its position within the RF resonator cavity 141. The position of the tuner paddle 146 may affect the resonant frequency of the excitation coil 145.

When RF power is applied to the excitation coil 145, a voltage is induced on the resonator coil 142. The RF power may have a frequency between 13.56 MHz and 40.68 MHz. Further, the amplitude of the induced voltage may be between 9 kV and 170 kV. The result is that the resonator coil 142 in each RF resonator cavity 141 is driven by a sinusoidal voltage. Each resonator coil 142 may be in electrical communication with a respective accelerator electrode 143. The ions pass through apertures 147 in each accelerator electrode 143.

The entry of the bunch into a particular accelerator electrode 143 is timed such that the potential of the accelerator electrode 143 is negative as the bunch approaches (for positive ions), but switches to positive as the bunch passes through the aperture 147 in the accelerator electrode 143. In this way, the bunch is accelerated as it enters the accelerator electrode 143 and is repelled as it exits. This results in an acceleration of the bunch. This process is repeated for each accelerator electrode 143 in the linear accelerator 140. Each accelerator electrode increases the acceleration of the ions and can be measured.

After the bunch exits the linear accelerator 140, it is implanted into the workpiece 150.

The ion implanter 100 may include other components, such as an electrostatic scanner to create a ribbon beam, quadrupole elements, additional electrodes to accelerate or decelerate the beam and other elements.

A controller 180 may be used to control the ion implanter 100. The controller 180 may include a processing unit and a memory device. The processing unit may be a microprocessor, a signal processor, a customized field programmable gate array (FPGA), or another suitable unit. This memory device may be a non-volatile memory, such as a FLASH ROM, an electrically erasable ROM or other suitable devices. In other embodiments, the memory device may be a volatile memory, such as a RAM or DRAM. The memory device comprises instructions that enable the controller 180 to control the linear accelerator 140.

As noted above, traditionally, each RF resonator cavity 141 is filled with sulfur hexafluoride and then sealed. However, in the present disclosure, sulfur hexafluoride is eliminated. Rather than including an insulating gas, the RF resonator cavity 141 is evacuated and maintained at high vacuum conditions. In some embodiments, the pressure within the RF resonator cavity 141 is maintained at less than 1 mTorr. In certain embodiments, the pressure within the RF resonator cavity 141 is maintained at less than 1E-5 Torr. The creation of vacuum conditions within the RF resonator cavity 141 may be achieved in several different ways.

Figure 2:
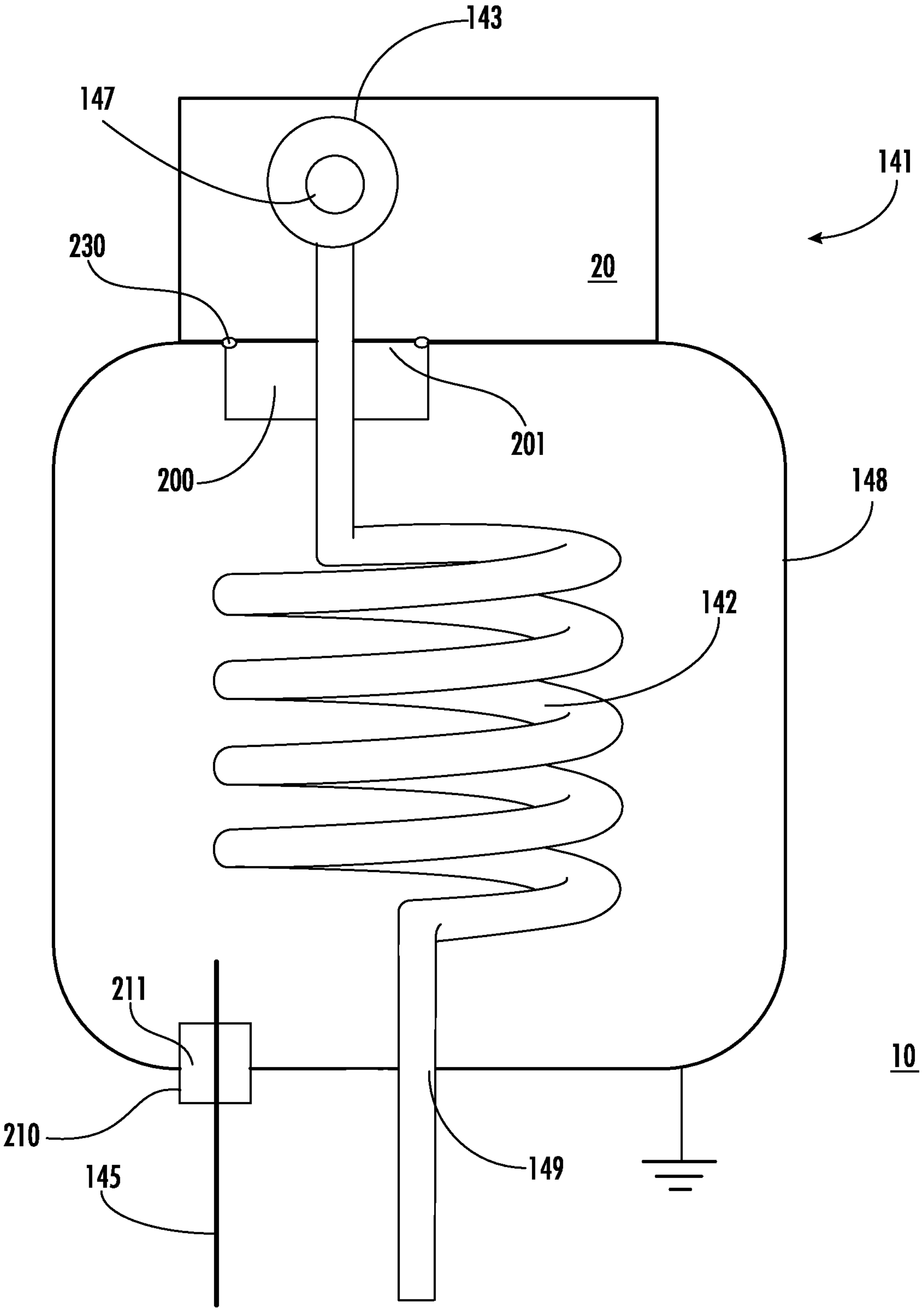
FIG. 2 shows an RF resonator cavity according to one embodiment.

FIG. 2 shows a first embodiment of an RF resonator cavity 141 that relies on vacuum to act as the insulator. The RF resonator cavity 141 is defined by a container 148. The container 148 of the RF resonator cavity 141 is typically made of a conductive material, such as a metal, and is electrically grounded. For example, the container 148 may be aluminum, copper or silver. In certain embodiments, the container 148 may be aluminum wherein the interior surface is plated with copper. As described above, a resonator coil 142 is disposed in the RF resonator cavity 141. The distal end of the resonator coil 142 is electrically and physically connected to the accelerator electrode 143, which is disposed in the vacuum chamber 20. In some embodiments, the material used for the accelerator electrode 143 may be a different material than that used for the resonator coil 142. For example, the accelerator electrode 143 may be aluminum, while the resonator coil 142 may be copper. An opening 201 is disposed on a first surface of the container 148 to allow the accelerator electrode 143 to attach to the resonator coil 142. Since the pressure within the RF resonator cavity 141 may differ from that in the vacuum chamber 20, a vacuum tight insulator 200, such as a polymer or a ceramic, is used to seal the RF resonator cavity 141 at the opening 201 near the distal end of the container 148. Note that the vacuum tight insulator 200 also serves to ensure that materials from within the RF resonator cavity 141 (such as copper) do not reach the vacuum chamber 20 and are not subsequently implanted in the workpiece.

As noted above, the accelerator electrode 143 is disposed in the vacuum chamber 20. Thus, O-rings 230 or some other sealing device may be disposed between the outer surface of the container 148 and the wall of the vacuum chamber 20. Note that the rest of the container 148 may be disposed in an atmospheric environment 10.

In some embodiments, the proximal end of the resonator coil 142 is disposed in the atmospheric environment 10. For example, a chiller or other fluid source may be connected to the proximal end of the resonator coil 142 to allow a cooling fluid to pass through the resonator coil 142. The point 149 where the resonator coil 142 enters the container 148 may be hermetically sealed, such as via welding. In some embodiments, the resonator coil 142 is electrically connected to the container 148 at point 149 and is therefore electrically grounded. Note that point 149 may be on an opposite side of the RF resonator cavity 141 from the opening 201.

The excitation coil 145 may enter the RF resonator cavity 141 through a second opening 211. A vacuum tight insulator 210, such as a polymer or a ceramic, is used to seal the RF resonator cavity 141 at the second opening 211 around the excitation coil 145. Although not shown, the tuner paddle 146 may also enter the RF resonator cavity 141 through a third opening which may likewise be sealed using a vacuum tight insulator.

In this embodiment, the air in the RF resonator cavity 141 is evacuated and the container 148 of the RF resonator cavity 141 is hermetically sealed. Weld joints, knife edge metal seals (such as conflat), indium O-rings, brazing, soldering, and other methods may be used to seal the container 148. Further, the container 148 may be subjected to a baking process to remove any residual moisture. The process of hermetically sealing a metal container is well known and is not described herein. In certain embodiments, the pressure within the container 148 may be less than 1 mTorr. In certain embodiments, the pressure may be less than 1E-5 Torr.

Figure 3:
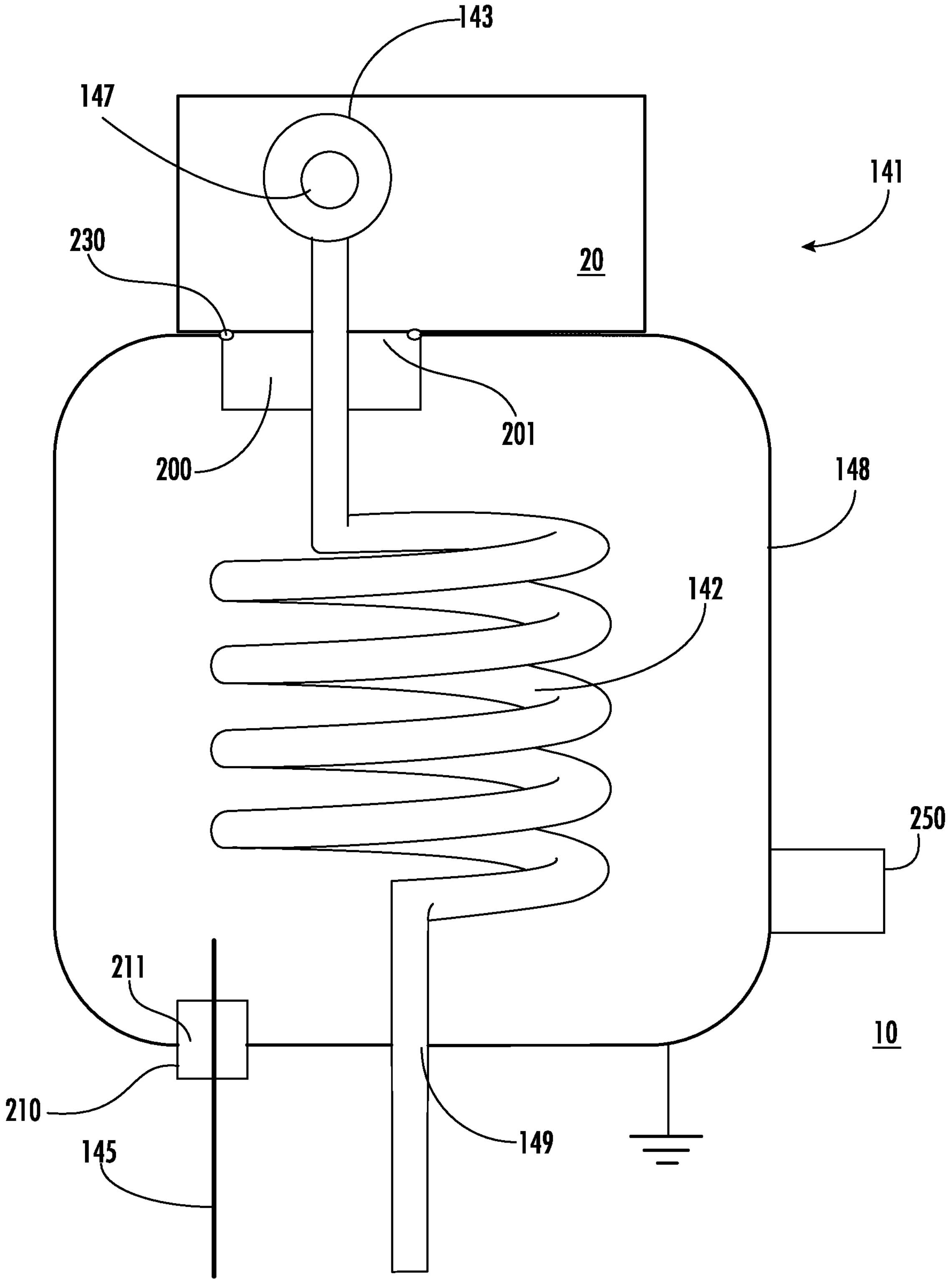
FIG. 3 shows an RF resonator cavity according to a second embodiment.

FIG. 3 shows a second embodiment of an RF resonator cavity 141. In this embodiment, the RF resonator cavity 141 is actively pumped using a vacuum system 250. Components from FIG. 2 have been given identical reference designators and are not described again. As described above, a resonator coil 142 and an excitation coil 145 may be disposed within the RF resonator cavity 141, and the container 148 is sealed at their respective openings 201, 211 using vacuum tight insulators 200, 210. In this embodiment, a vacuum system 250 is in communication with the interior of the container 148. The vacuum system 250 is used to actively pump the pressure of the RF resonator cavity 141 to less than 1 mTorr and may be less than 1E-5 Torr. The exhaust side of the vacuum system 250 may be disposed in the atmospheric environment 10. Various types of vacuum systems may be utilized. For example, in one embodiment, the vacuum system 250 comprises a turbo pump in communication with the interior of the container 148 and a backing pump in communication with the exhaust from the turbo pump. In other embodiments, the vacuum system 250 may include an ion pump, a cryo pump, a sublimation pump or another type of vacuum pump.

The embodiments described above in the present application may have many advantages. First, the present RF resonator cavities eliminate the use of sulfur hexafluoride, one of the six categories of gasses that are monitored in the Kyoto Protocol. Further, the use of vacuum also eliminates the environment impact if a seal should fail. Further, since the $SF_6$ has been eliminated, there is no need for a sulfur hexafluoride recovery device, which may cost hundreds of thousands of dollars. Additionally, the use of vacuum may improve the robustness of the RF resonator cavity. Vacuum has a dielectric strength that is three times greater than sulfur hexafluoride. Thus, the risk of arcing may also be reduced with the use of these improved RF resonator cavities.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An ion implanter, comprising:
an ion source; and
a linear accelerator, wherein the linear accelerator comprises one or more RF resonator cavities, wherein each RF resonator cavity is defined by a container, wherein a resonator coil and an excitation coil are disposed in each respective RF resonator cavity, and wherein the container is hermetically sealed and a pressure within the container is less than 1E-5 Torr and sulfur hexafluoride is not disposed in the container.

2. The ion implanter of claim 1, wherein a distal end of the resonator coil is affixed to an accelerator electrode.

3. The ion implanter of claim 2, wherein the accelerator electrode passes through an opening in the container, such that a first portion of the accelerator electrode is disposed inside the RF resonator cavity and a second portion is disposed outside the RF resonator cavity, and wherein a vacuum tight insulator is used to seal the opening.

4. The ion implanter of claim 1, wherein the excitation coil is in communication with a RF generator and a portion of the excitation coil passes through an opening in the container, and wherein a vacuum tight insulator is used to seal the opening.

5. An ion implanter, comprising:
an ion source to generate ions; and
a linear accelerator, wherein the linear accelerator comprises one or more RF resonator cavities, wherein each RF resonator cavity is defined by a container, wherein a resonator coil and an excitation coil are disposed in each respective RF resonator cavity, wherein the ions pass through an aperture in an accelerator electrode that is located outside the RF resonator cavity and further comprising a vacuum system in communication with each RF resonator cavity to pump air from the RF resonator cavity to an atmospheric environment, such that a pressure within the container is less than 1 mTorr.

6. The ion implanter of claim 5, wherein the pressure within the container is pumped to less than 1E-5 Torr.

7. The ion implanter of claim 5, wherein sulfur hexafluoride is not disposed in the container.

8. The ion implanter of claim 5, wherein the vacuum system comprises a turbo pump in communication with the RF resonator cavity, and a backing pump in communication with an output of the turbo pump.

9. The ion implanter of claim 5, wherein a distal end of the resonator coil is affixed to the accelerator electrode.

10. The ion implanter of claim 9, wherein the accelerator electrode passes through an opening in the container, such that a first portion of the accelerator electrode is disposed inside the RF resonator cavity and a second portion is disposed outside the RF resonator cavity, and wherein a vacuum tight insulator is used to seal the opening.

11. The ion implanter of claim 7, wherein the excitation coil is in communication with a RF generator and a portion of the excitation coil passes through an opening in the container, and wherein a vacuum tight insulator is used to seal the opening.

* * * * *